(12) United States Patent
Meyer

(10) Patent No.: US 7,338,100 B2
(45) Date of Patent: Mar. 4, 2008

(54) UNIVERSAL BUMPER GUARD

(76) Inventor: Wayne Meyer, 1009 Arlington Oaks Ter., St. Louis, MO (US) 63017

( * ) Notice: Subject to any disclaimer, the term of this patent is extended or adjusted under 35 U.S.C. 154(b) by 0 days.

(21) Appl. No.: 11/198,502

(22) Filed: Aug. 5, 2005

(65) Prior Publication Data

US 2007/0029827 A1    Feb. 8, 2007

(51) Int. Cl.
*B60J 11/00* (2006.01)
(52) U.S. Cl. .............. 293/142; 296/136.01; 296/136.1; 150/166
(58) Field of Classification Search ............... 293/142, 293/172, 117; 296/98, 39.1, 136.01, 136.1, 296/136.04, 37.16, 37.1, 100.1, 100.18; 150/166, 150/167; 280/770; 160/23.1, 314
See application file for complete search history.

(56) References Cited

U.S. PATENT DOCUMENTS

| | | | | |
|---|---|---|---|---|
| 1,912,231 A * | 5/1933 | Wandscheer | ............... | 150/166 |
| 2,460,394 A | 2/1949 | Peatross | ............ | 280/150 |
| 2,919,141 A * | 12/1959 | Hughes | ............ | 280/727 |
| 3,170,714 A | 2/1965 | Stalker | ............ | 280/150 |
| 3,563,594 A | 2/1971 | London | ............ | 293/1 |
| 3,902,752 A | 9/1975 | Pelletier | ............ | 296/91 |
| 4,848,823 A * | 7/1989 | Flohr et al. | ............ | 296/98 |
| 4,856,842 A | 8/1989 | Ross et al. | ............ | 296/136 |
| 4,958,881 A * | 9/1990 | Piros | ............ | 296/98 |
| 5,022,700 A | 6/1991 | Fasiska et al. | ............ | 276/98 |
| 5,129,678 A | 7/1992 | Gurbacki | ............ | 280/770 |
| 5,503,212 A * | 4/1996 | Lin | ............ | 160/370.22 |
| 5,597,196 A * | 1/1997 | Gibbs | ............ | 296/98 |
| 5,618,073 A | 4/1997 | Criscione | ............ | 293/142 |
| 5,868,425 A | 2/1999 | McNulty | ............ | 280/770 |
| 6,196,623 B1 | 3/2001 | Shackelford et al. | ....... | 296/199 |
| 6,296,279 B1 | 10/2001 | Stoddard et al. | ............ | 280/770 |
| 6,422,635 B1 * | 7/2002 | Steffens et al. | ........ | 296/100.09 |
| 6,641,203 B1 | 11/2003 | Everett | ............ | 296/136.11 |
| 6,663,156 B1 | 12/2003 | Kincaid et al. | ............ | 296/39.1 |
| 6,880,879 B2 | 4/2005 | Pickard | ............ | 296/136.01 |
| D508,222 S * | 8/2005 | Tekavec | ............ | D12/167 |
| 2003/0034660 A1 | 2/2003 | Kelly | ............ | 293/142 |
| 2003/0038497 A1 | 2/2003 | Fitzgerald | ............ | 296/39.1 |
| 2005/0242558 A1 * | 11/2005 | Cohen | ............ | 280/770 |
| 2006/0022483 A1 * | 2/2006 | Emerson | ............ | 296/136.04 |

* cited by examiner

*Primary Examiner*—Dennis H. Pedder
*Assistant Examiner*—Mike Hernandez
(74) *Attorney, Agent, or Firm*—Polsinelli Shalton Flanigan Suelthaus PC

(57) ABSTRACT

The present invention relates to as a universal bumper guard including a retractable cover, a cover housing that contains the retractable cover, a frame holding the cover housing, connection devices for connecting the cover housing of the universal bumper guard to an interior region of the trunk of the automobile, wherein the connection devices are slidably connected to the frame.

21 Claims, 20 Drawing Sheets

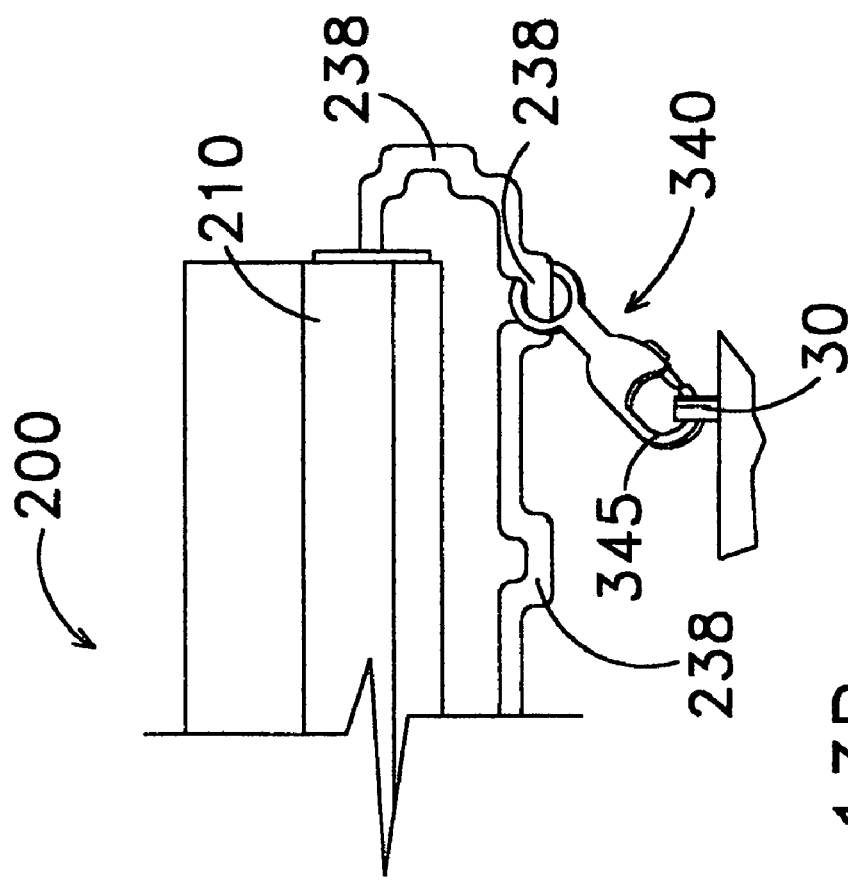
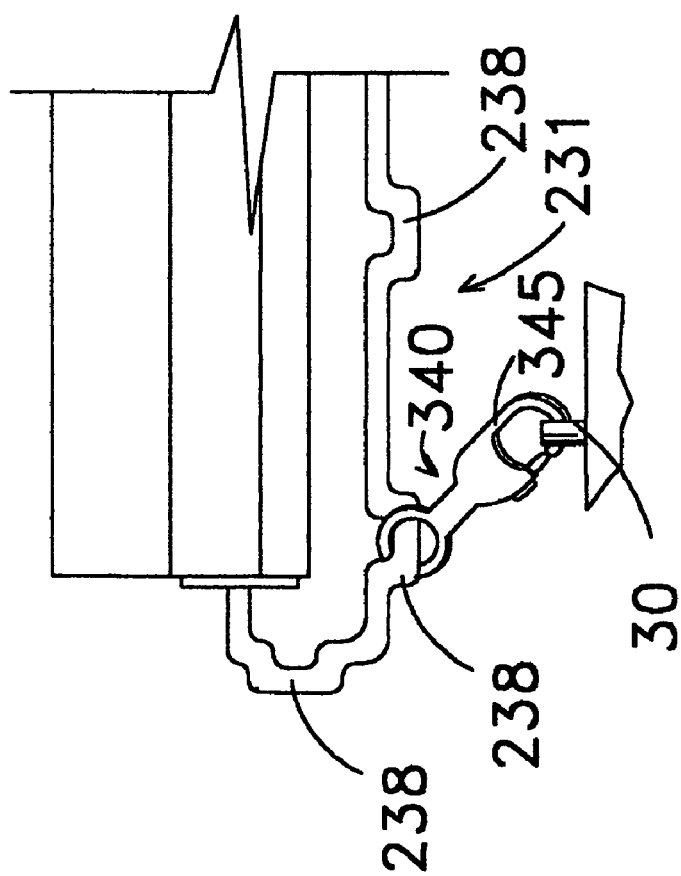
FIG 13B

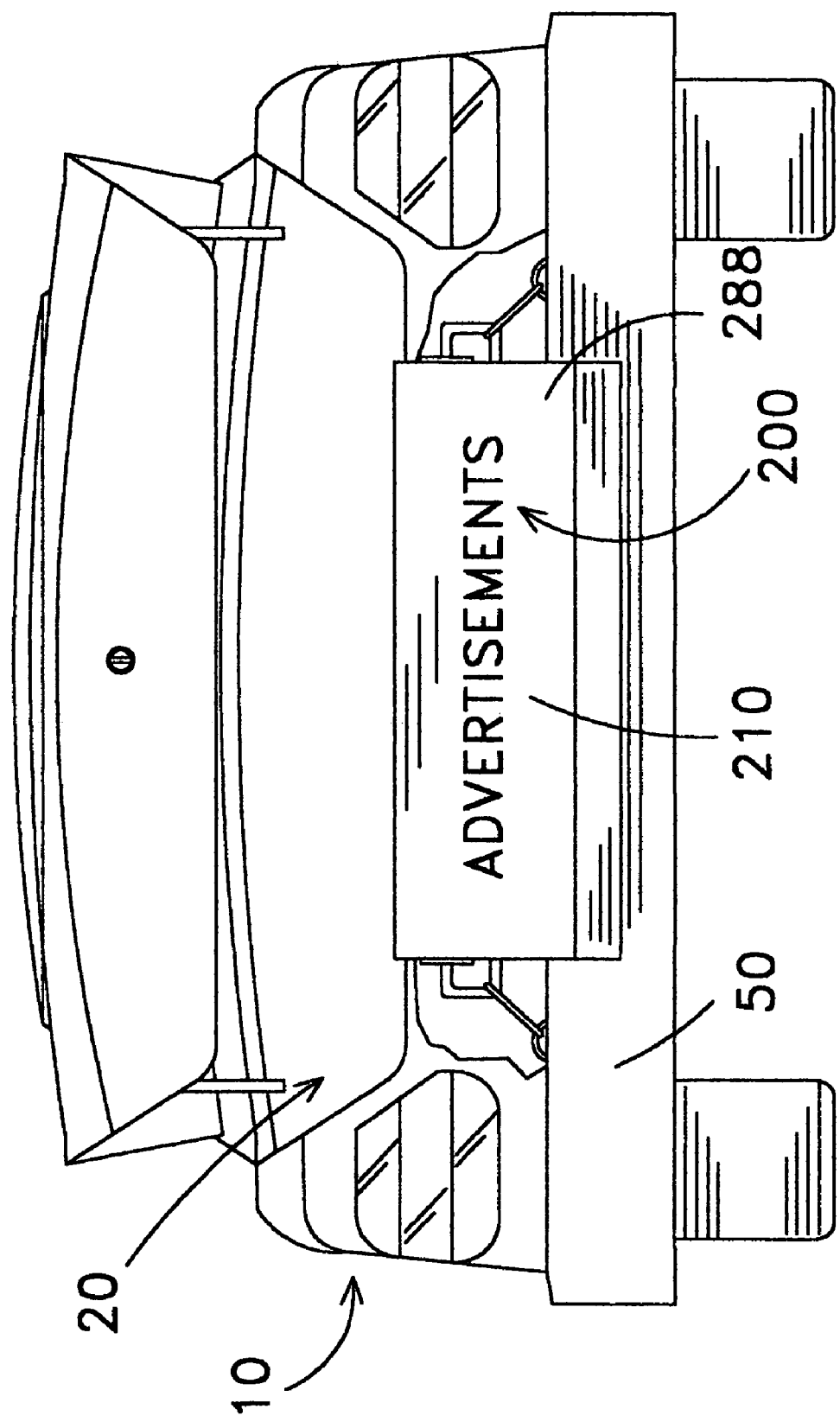

UNIVERSAL BUMPER GUARD

FIELD OF THE INVENTION

The present invention relates to a universal bumper guard.

BACKGROUND OF THE INVENTION

Prior art bumper/fender protection devices or guards often require fastening means, such as screws, that permanently fasten to a trunk or the interior of a trunk. This may leave unwanted holes in the trunk or its walls. Moreover, many prior art devices require disassembly of components to remove it from the trunk.

Other prior art bumper/fender protection devices or guards are limited to a particular size trunk and are not flexible to accommodate different sized trunks.

SUMMARY OF THE INVENTION

The present invention relates to a universal bumper guard for an automobile that protects the bumper and/or its finish from damage during the unloading and loading of a trunk of the automobile or from items, such as golf-clubs or grocery carts, leaned or positioned against the bumper. The universal bumper guard further prevents the operator of the automobile from contacting the bumper to protect the operator from contacting dirt and grime on the bumper.

The universal bumper guard generally comprises a retractable cover, a cover housing, a frame, and temporary connection devices for connecting the universal bumper guard to an interior region of the trunk of the automobile.

The retractable cover includes a sheet of material that covers the bumper. The cover housing includes a rotating axis or axle that winds and unwinds the retractable cover. The cover housing supports the retractable cover.

The frame is made of a rigid material that has a generally narrow dimension. The frame includes side portions and a rear portion. The side portions of the frame hold or secure the cover housing for the retractable cover. The rear portion of the frame is generally parallel to the retractable cover.

The connection devices are slidably connected to the frame. Generally, the present invention employs two individual connection devices. A first end of each of the connection devices slidably connects to the frame, and the other end of each of the connection devices attaches to the trunk.

The connection devices may include a snap with a ring, a cotter pin with a ring, or a another similar device. The snap and the cotter pin connection device will connect to nearly all interior regions of current production automobiles, as nearly all current production automobiles include posts that could receive the cotter pin connection device or D-rings that could receive the snap connection device.

The term "temporary" relates to the present invention's ability to be quickly installed and removed from the trunk. The present invention does not require any permanent fixtures, such as screws, brackets, etc., to be attached to the trunk. Should the user decide to remove the present invention from their trunk, it may be quickly removed without leaving any holes, components, or changes to the trunk.

The term "universal" relates to the present invention's ability to attach or connect to the pre-existing structures of most trunks. The design of the present invention provides flexibility to adjust the universal bumper guard to most trunks of varying size.

Installation of the universal bumper guard includes opening the trunk and attaching the connection devices to the pre-existing posts or D-rings in the trunk. Importantly, the universal bumper guard will attach to nearly all current production automobiles by use of its frame and slidably connected connection device. As mentioned above, most automobiles include either the posts or the rings in their trunk, however, the positioning of the post or ring varies between manufacturer and the size of the vehicle. The present invention provides a universal bumper guard that may be used with nearly all conventional automobiles regardless of the size of their trunk or the positioning of the posts or D-rings. Since the connection devices are slidably connected to the frame, the connection device may slide up and down the frame to a position such that they may connect to the posts or the D-rings regardless of the specific positioning of the posts or the D-rings. This slideable connection accommodates most present automobiles and should accommodate the automobiles of the future.

The retractable cover also includes a two-sided material. A top-side of the retractable cover is made from a durable, scratch-resistant, and puncture-resistant material that is preferably washable. The top-side of the cover should withstand and protect the bumper from contact with grocery carts, golf clubs, and the like. The top-side of the cover protects the bumper and its finish from items placed in and/or removed from the trunk. The top-side of the cover may optionally include graphics, advertising, and the like. The bottom-side of the cover includes a soft, non-scratch material that rests against the bumper. Both sides of the cover are designed to protect the finish (painted, chromed, or otherwise) from scratches, cuts, mars, and the like.

To use the universal bumper guard, the owner simply draws the cover from the cover housing and pulls the cover down over the bumper. The cover housing includes a spring-loaded retraction mechanism that winds and unwinds the cover about its axis. When not in use, the universal bumper guard may be stored in the trunk or may be quickly removed should the user desire a completely empty trunk.

BRIEF DESCRIPTION OF THE DRAWINGS

FIG. 13(b) shows a view of the rear portion of the frame with multiple indents.

FIG. 20 shows a view of the rear of the automobile with the universal bumper guard including graphics deployed.

DETAILED DESCRIPTION OF THE PREFERRED EMBODIMENT

Figure 1:
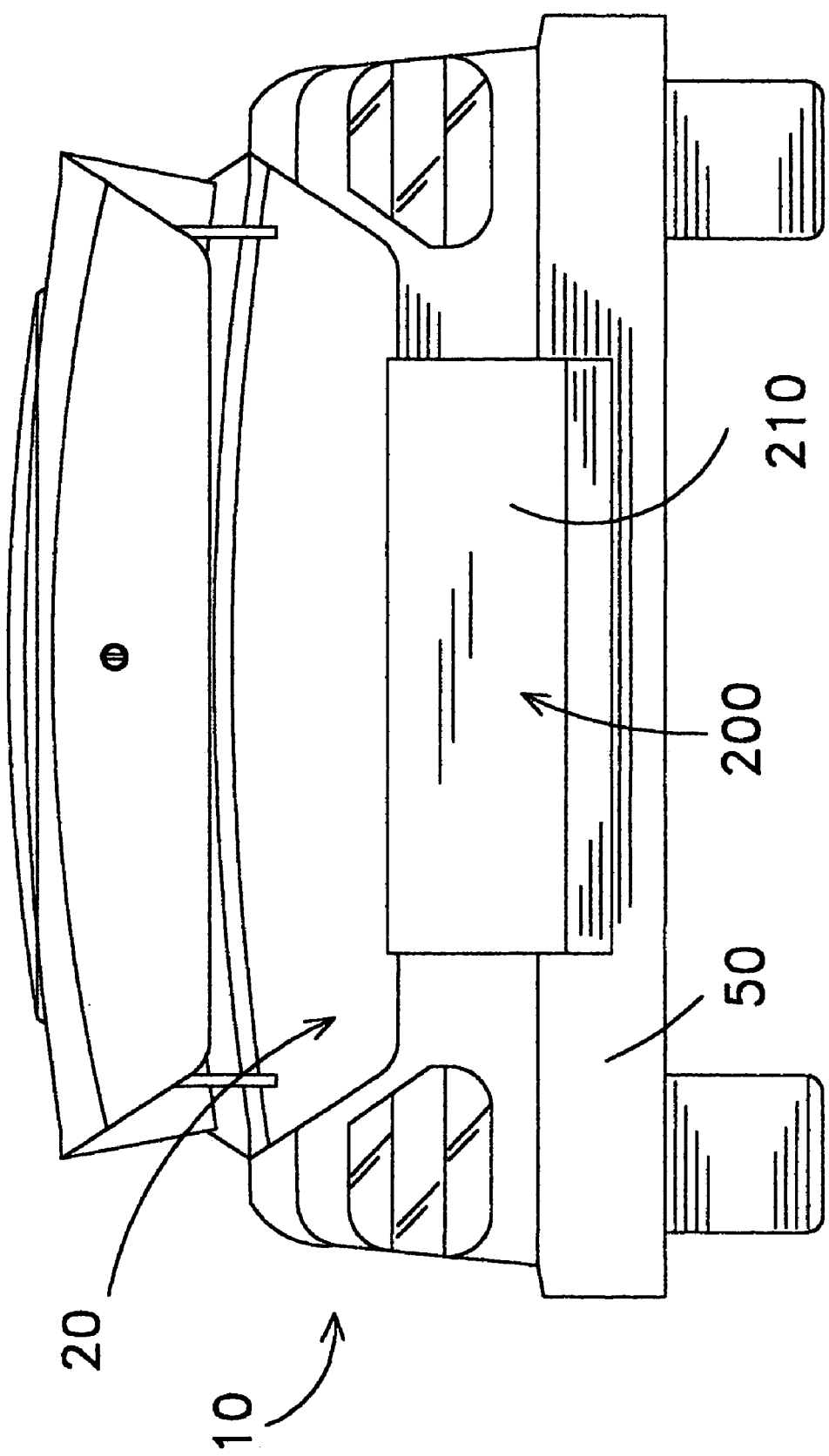
FIG. 1 shows the rear of the automobile with the universal bumper guard deployed.

The universal bumper guard generally comprises a retractable cover, a cover housing, a frame, and connection devices for connecting the universal bumper guard to an interior region of the trunk of the automobile.

The cover housing includes a rotating axis that winds and unwinds the retractable cover. The retractable cover includes a sheet of material that covers the bumper. The sheet of material winds about an axle of the retractable cover. A retraction mechanism mechanically unwinds the sheet of material when the user pulls on the sheet of material.

The material should be long enough to cover the interior lip of the trunk, the exterior lip of the trunk, and the bumper. In the case of sport utility vehicle, the material may cover a portion of the cargo area and the bumper. Of course, the material may be retracted to a length desired by the user. The material should be wide enough to substantially cover the opening of the trunk. The material may be approximately four feet to approximately six feet in width and approximately three foot to approximately six foot in length.

The frame includes side portions and a rear portion. The side portions of the frame hold or secure the cover housing for the retractable cover. The rear portion of the frame is generally parallel to the cover housing for the retractable cover.

The frame is made of a rigid material that has a generally narrow dimension, such as a rod. The rigid material may include aluminum or other lightweight metallic material. In other embodiments, the rigid material may include a hard plastic material. The side portions and the rear portion may be made from a single piece of the rigid material that is shaped through conventional metalworking techniques. In other embodiments, the side portions may be fastened to the rear portion via a tubular connection device, welding/soldering techniques, angled brackets, or other metal fasteners such as screws, rivets, etc.

The connection devices are slidably connected to the frame. The connection device may be moved on the frame to accommodate different trunk structures. This important feature of the present invention provides for the universal bumper guard to be adapted to nearly all trunks. The connection devices are further connected to the interior of the trunk.

The present invention may be employed in most automobiles, including sedan, sport utility vehicles, vans, etc. One of ordinary skill in the art will readily be able to adjust the dimensions of the universal bumper guard to accommodate the trunk or cargo area opening of the automobile.

One end of the connection device should slideably connect to the frame. The other end of the connection device should attach to the trunk. In a preferred embodiment, the connection device includes a snap with a ring or a cotter pin with a ring. The snap and the cotter pin connection device will connect to nearly all interior regions of current production automobiles, as nearly all current production automobiles include posts that could receive the cotter pin connection device or D-rings that could receive the snap connection device.

Installation of the universal bumper guard includes opening the trunk and attaching either the snap or the cotter pin connection device to the pre-existing post or D-rings in the trunk. Importantly, the universal bumper guard will attach to nearly all current production automobiles by use of its frame and slidably connected connection device. As mentioned above, most automobiles include either the posts or the rings in their trunk, however, the exact positioning of the post or the ring in the trunk varies between manufacturer and the size of the vehicle. The present invention provides a universal bumper guard that may be used with nearly all conventional automobiles regardless of the size of their trunk. Since the connection devices are slidably connected to the frame, the connection devices may slide up and down the frame to a position such that they may connect to the posts or the rings located in the trunk.

The retractable cover preferably includes a two-sided material. A top-side of the retractable cover is made from a durable, scratch-resistant material, that is preferably washable. The durable side may include a vinyl, plastic, nylon, or other similar material. The bottom-side of the cover includes a soft, non-scratch material that rests against the bumper. The bottom or soft side may be made from cotton, chamois, fleece, lambs wool, or other similar material. The top-side and the bottom-side may be joined by adhesives or by sewing the two sides together. In other embodiments, a laminate material having a durable, scratch-resistant side and soft, non-scratch side may be employed.

The material for the retractable cover may vary depending upon it application. For most sedan applications, the material may have a thickness of approximately 1/8 inch to approximately 3/16 inch. For van and sport utility vehicle applications the material may be thicker, i.e., approximately 3/16 inch to approximately 1/4 inch. The thicker material may provide more protection against scratches and dents.

To use the universal bumper guard, the owner simply draws the cover from the retraction mechanism of the cover housing and pulls the cover down over the bumper. The cover housing includes a spring-loaded retraction mechanism that winds and unwinds the cover about its axis. When not in use, the universal bumper guard may be stored in the trunk.

The present invention will now be described with reference to the embodiments shown in the figures.

Figure 2:
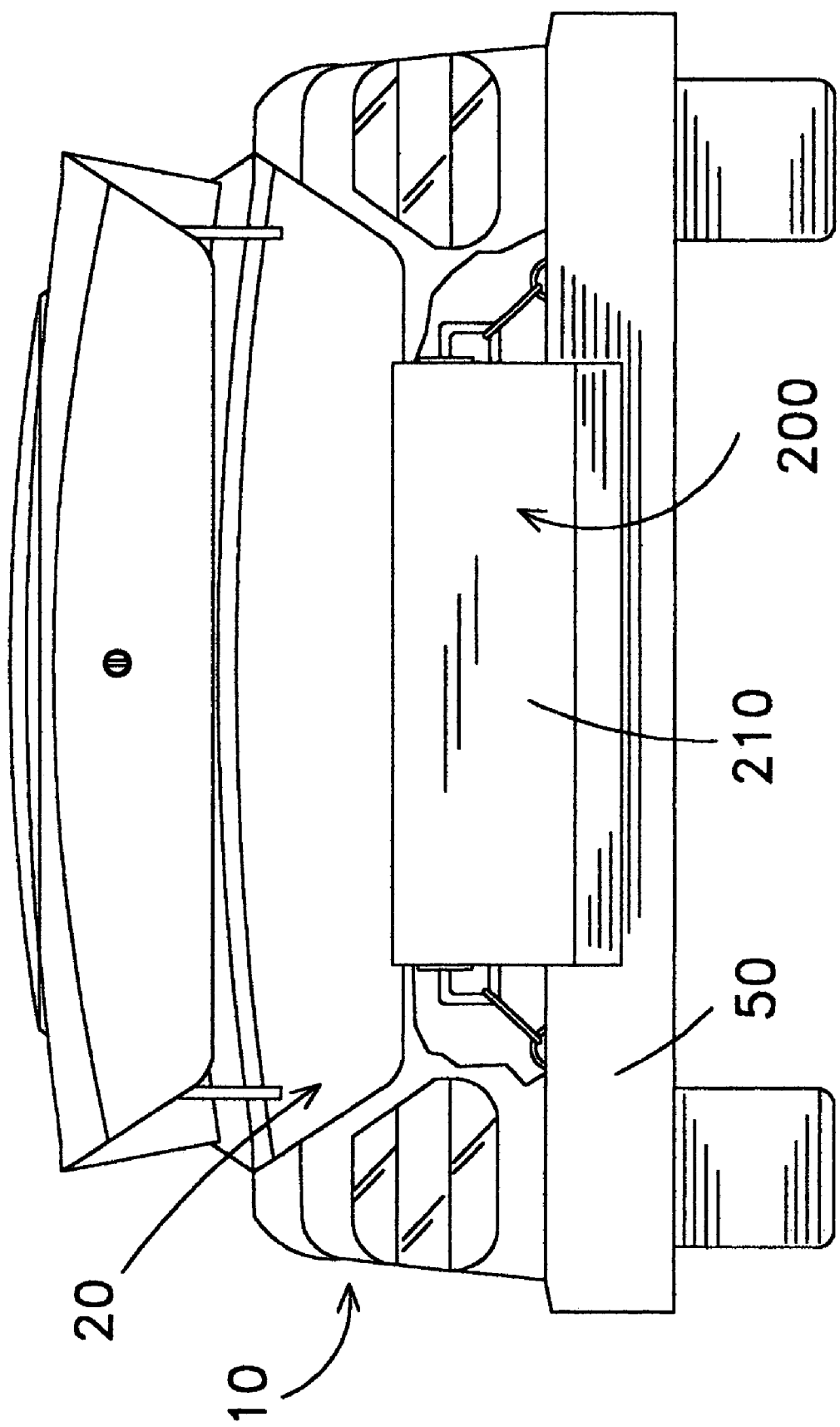
FIG. 2 shows a view of the rear of the automobile with a cutout of the trunk shown with the universal bumper guard deployed.

FIGS. 1 and 2 show a universal bumper guard 200 deployed from a trunk 20 of an automobile 10. Although automobile 10 is shown as a sedan-type automobile, the universal bumper guard may be employed in sports utility vehicles, vans, etc. A retractable cover 210 of the universal bumper guard 200 covers a bumper 50 of the automobile 10.

Figure 3:
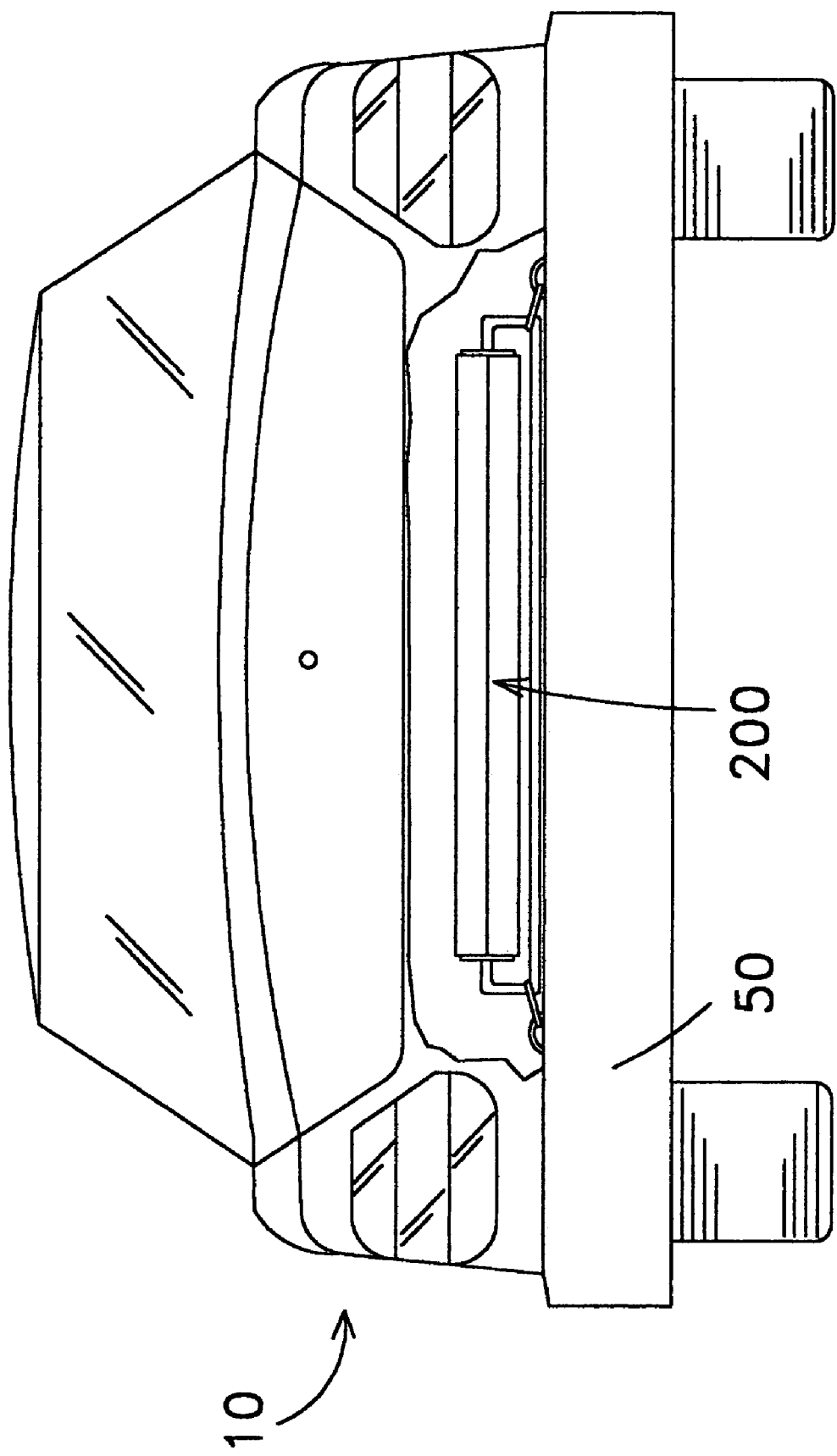
FIG. 3 shows the rear of the automobile with a cutout view showing the universal bumper guard in the storage position.

FIG. 3 shows the universal bumper guard 200 in a storage position, resting on a floor of the trunk 20. The universal bumper guard 200 may rest against a rear inside wall of the trunk when not in use. Due to its compact size, the universal bumper guard 200 does not utilize much space in the trunk 20.

Figure 4:
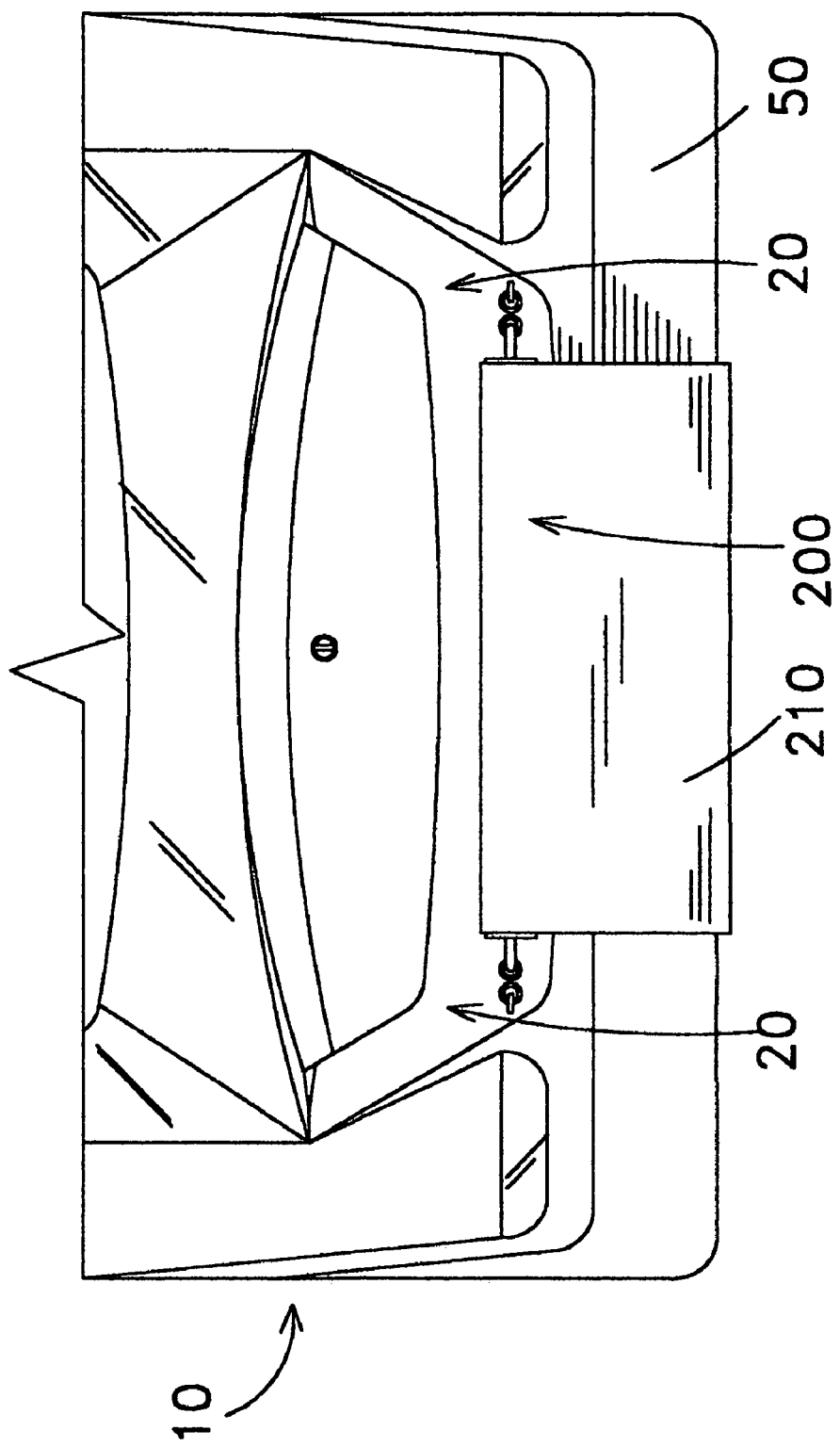
FIG. 4 shows a top-down view of the trunk with the universal bumper guard deployed.
Figure 5:
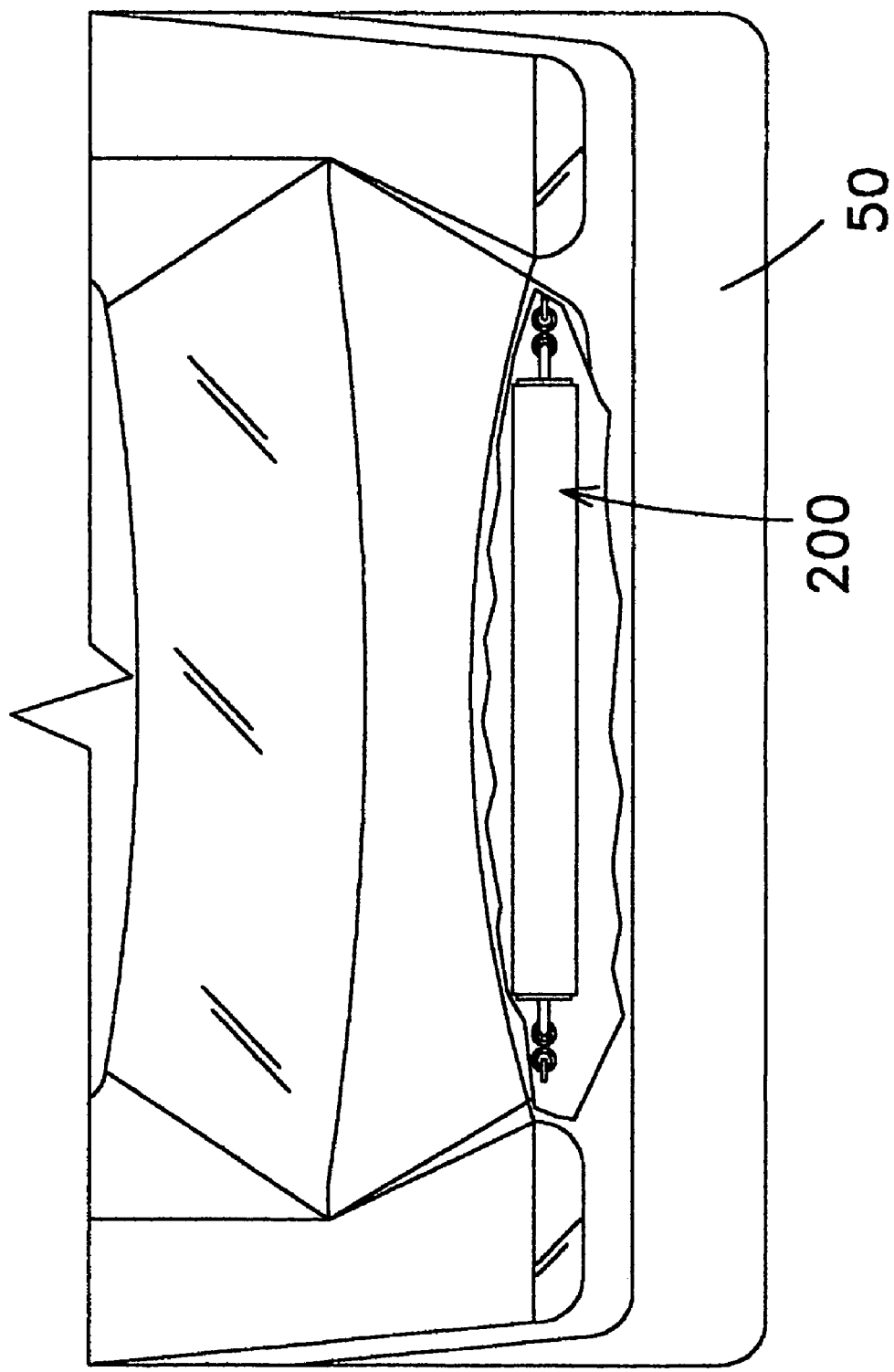
FIG. 5 shows a top-down view with a cutout of the universal bumper guard in the storage position.
Figure 6:
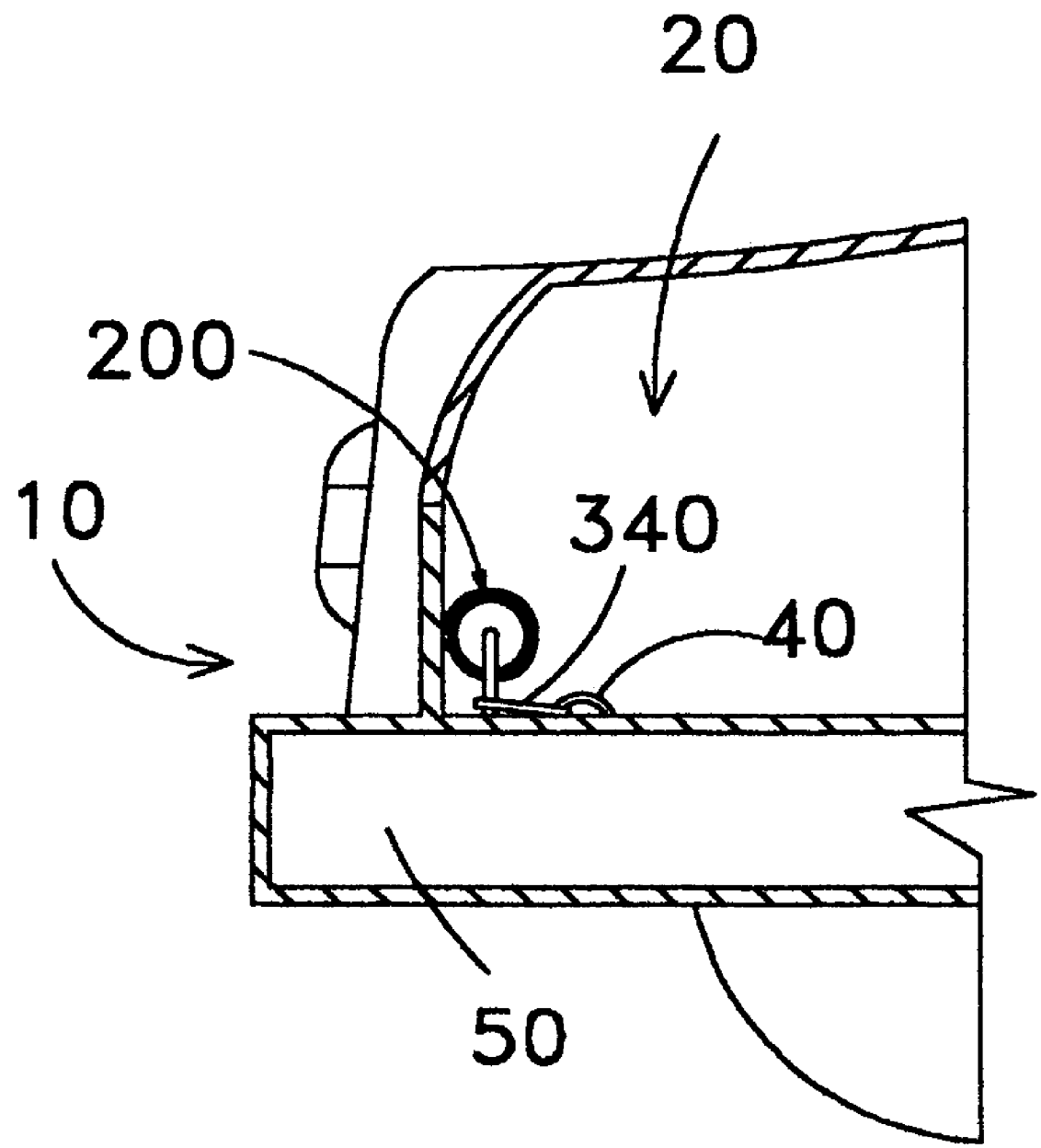
FIG. 6 shows a side sectional view of the universal bumper guard in the storage position.
Figure 7:
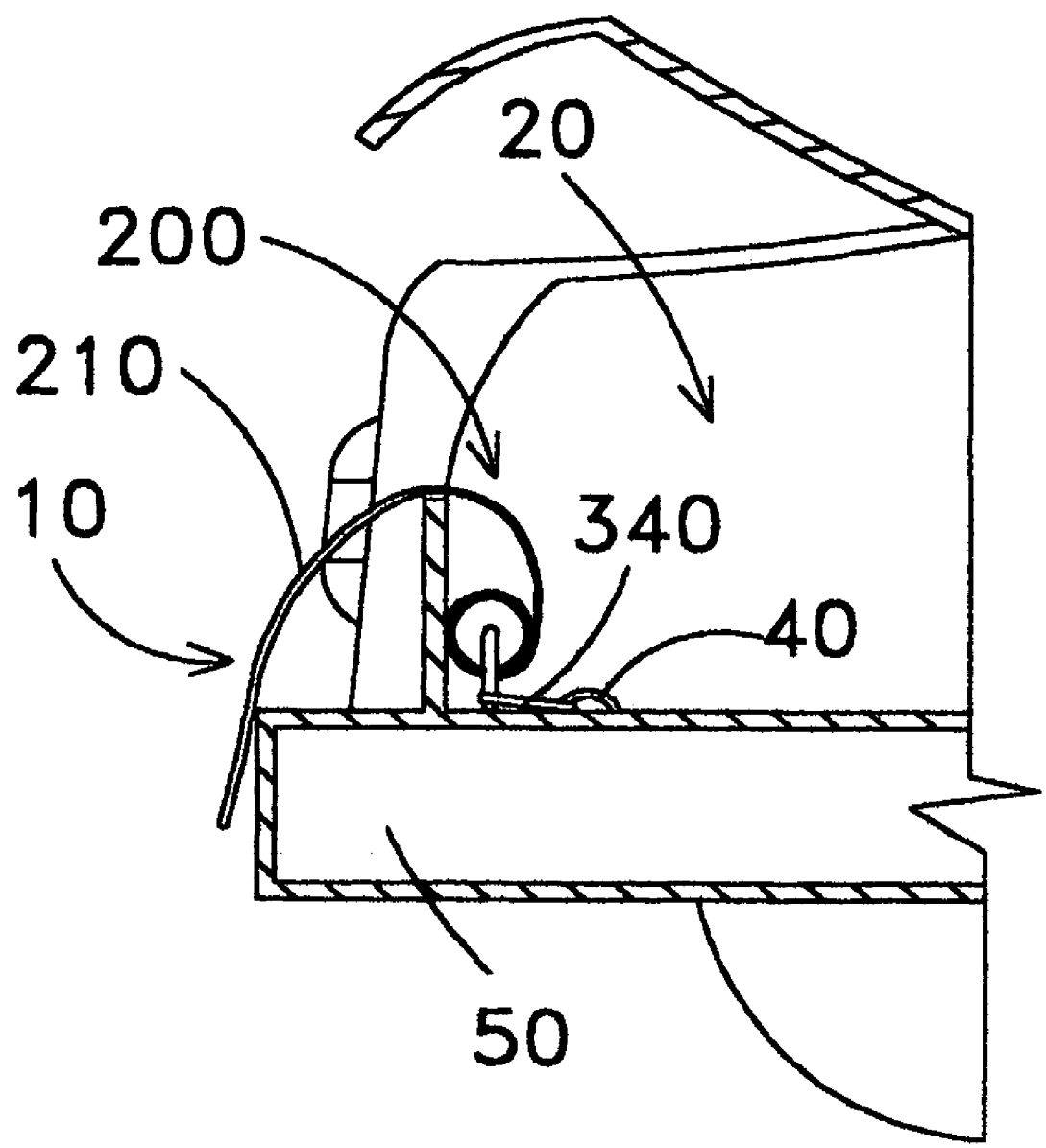
FIG. 7 shows a side sectional view of the universal bumper guard deployed.
Figure 8:
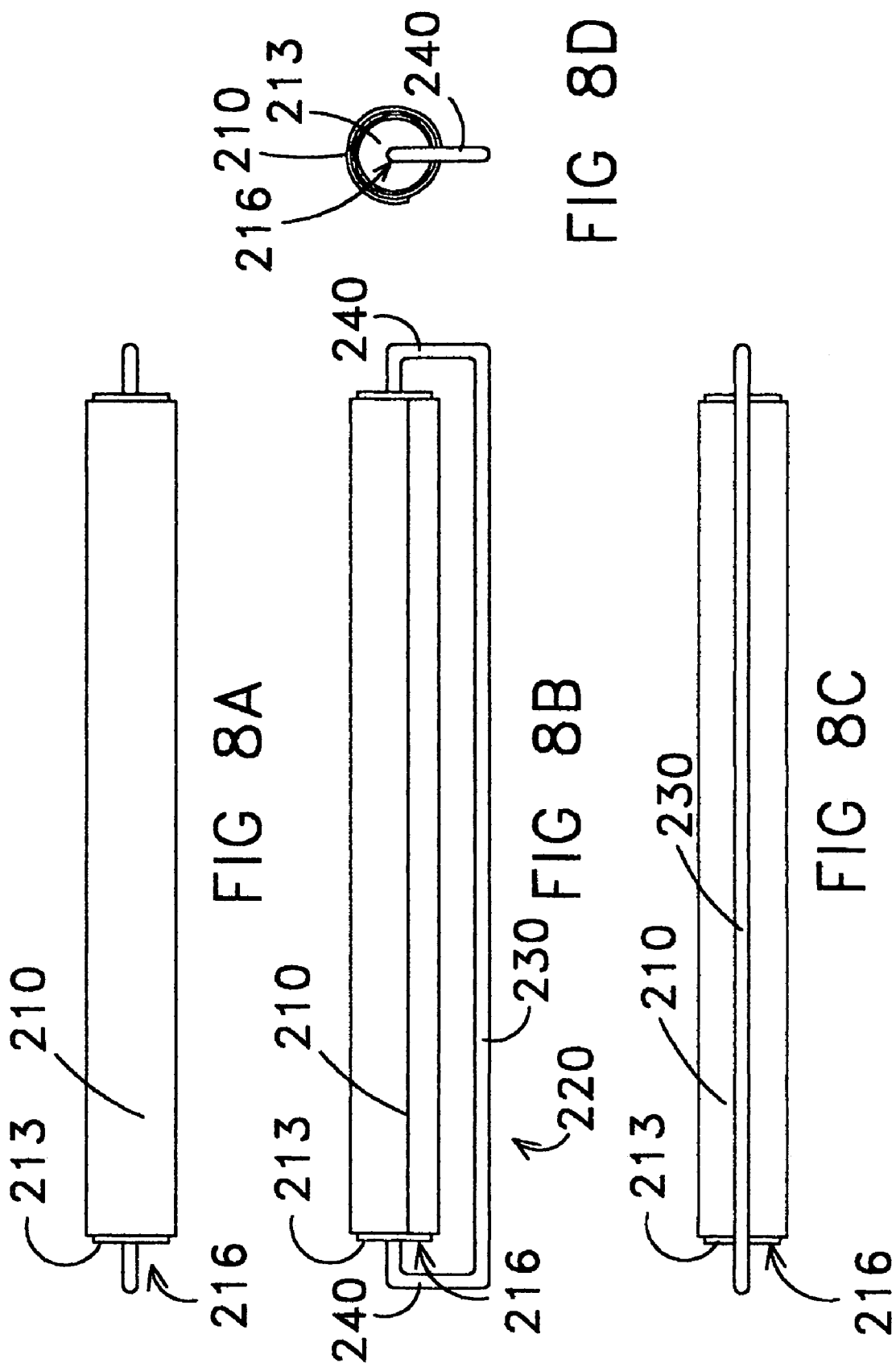
FIGS. 8(a)-8(d) show views of the retractable cover and frame.

FIG. 4 shows a top-down view of the universal bumper guard 200 in a deployed position. FIG. 5 shows a top-down cut-out view of the universal bumper guard 200 in a storage position. FIG. 6 shows a side sectional view of the universal bumper guard 200 in a storage position. FIG. 7 shows a side sectional view of the universal bumper guard 200 in a deployed position.

As shown in FIGS. 8(a)-8(d), the retractable cover 210 includes an axle 213 and a retraction mechanism 216. The retractable cover 210 winds about the axle 213. The axle 213 and the retraction mechanism 216 connect to a frame 220. The retraction mechanism 216 is a spring-activated device that winds and unwinds the retractable cover 210.

Figure 9:
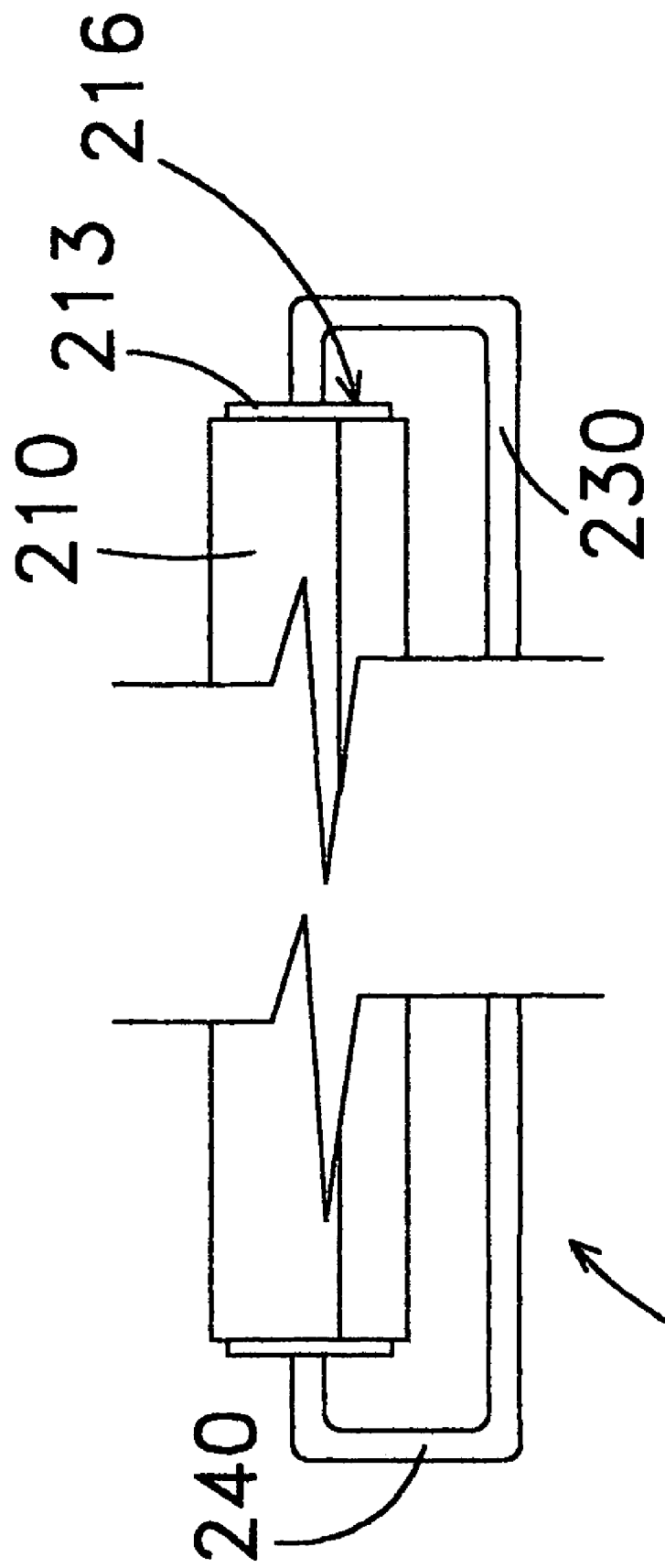
FIG. 9 shows a break away view of the retractable cover.
Figure 10:
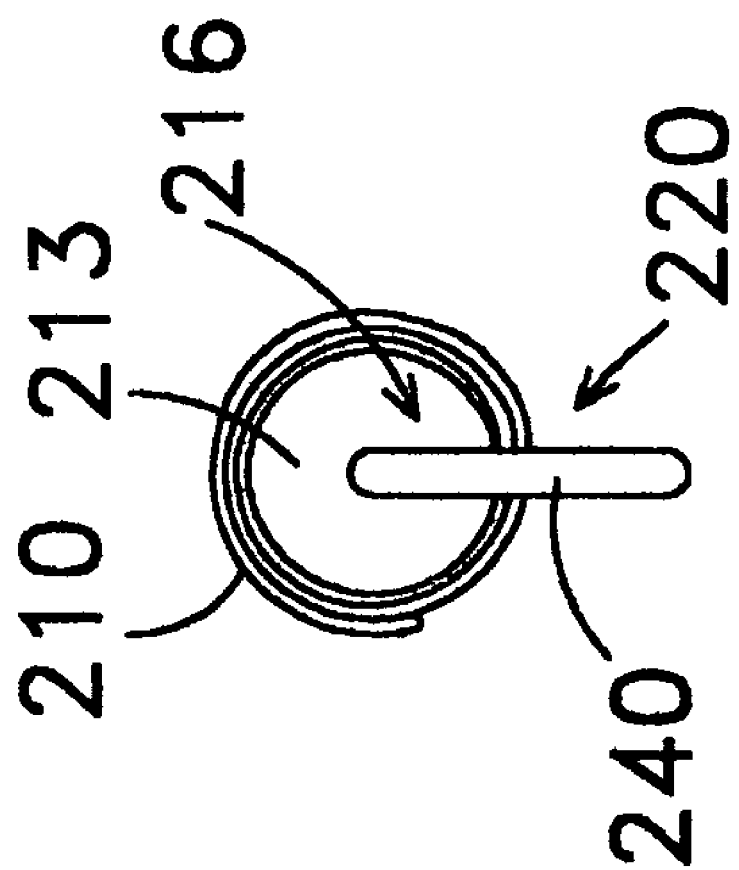
FIG. 10 shows a side view of the retractable cover.

As shown in FIG. 9, the frame 220 and the cover housing generally form a rectangular shape. The frame 220 includes side portions 240 (shown in FIGS. 9 and 10) and a rear portion 230 (shown in FIG. 9). The side portions 240 generally are of the same length, while the rear portion 230 is longer. The side portions 240 generally are also generally perpendicular in orientation to the rear portion 230.

Figure 11:
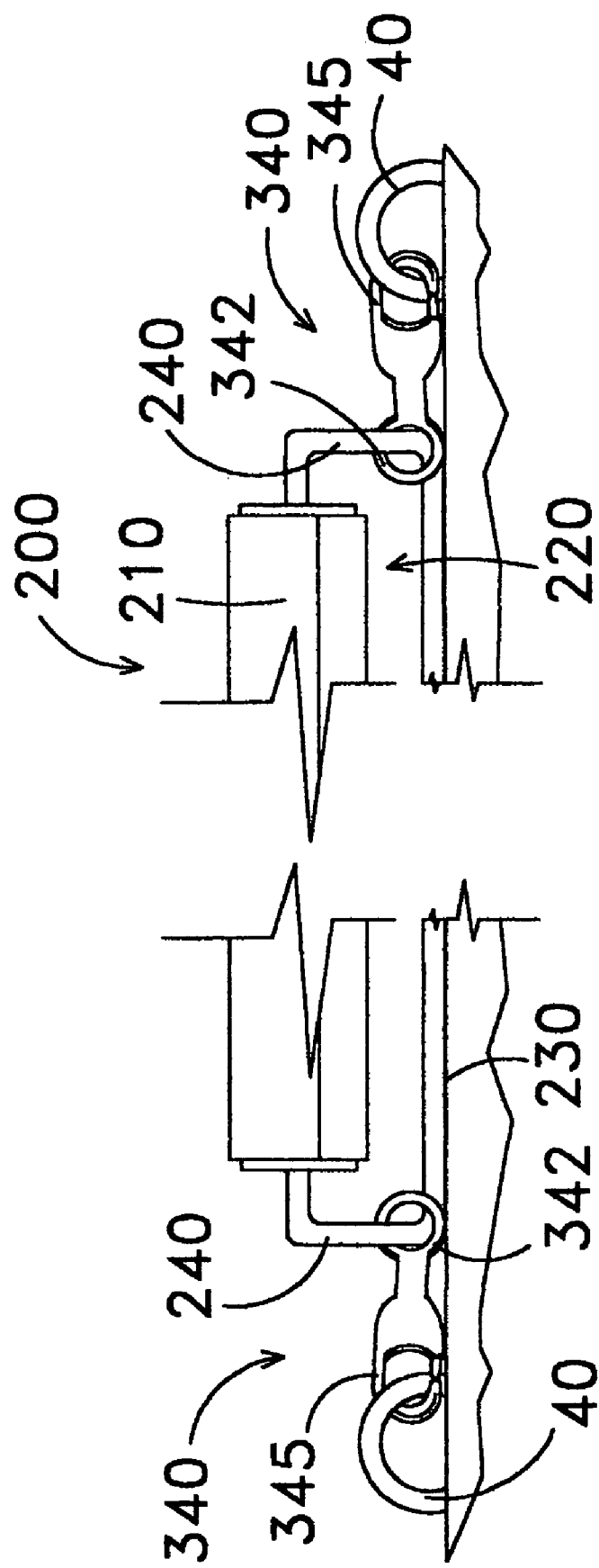
FIG. 11 shows a view of the universal bumper guard with a snap-ring connection device connecting to D-rings.
Figure 12:
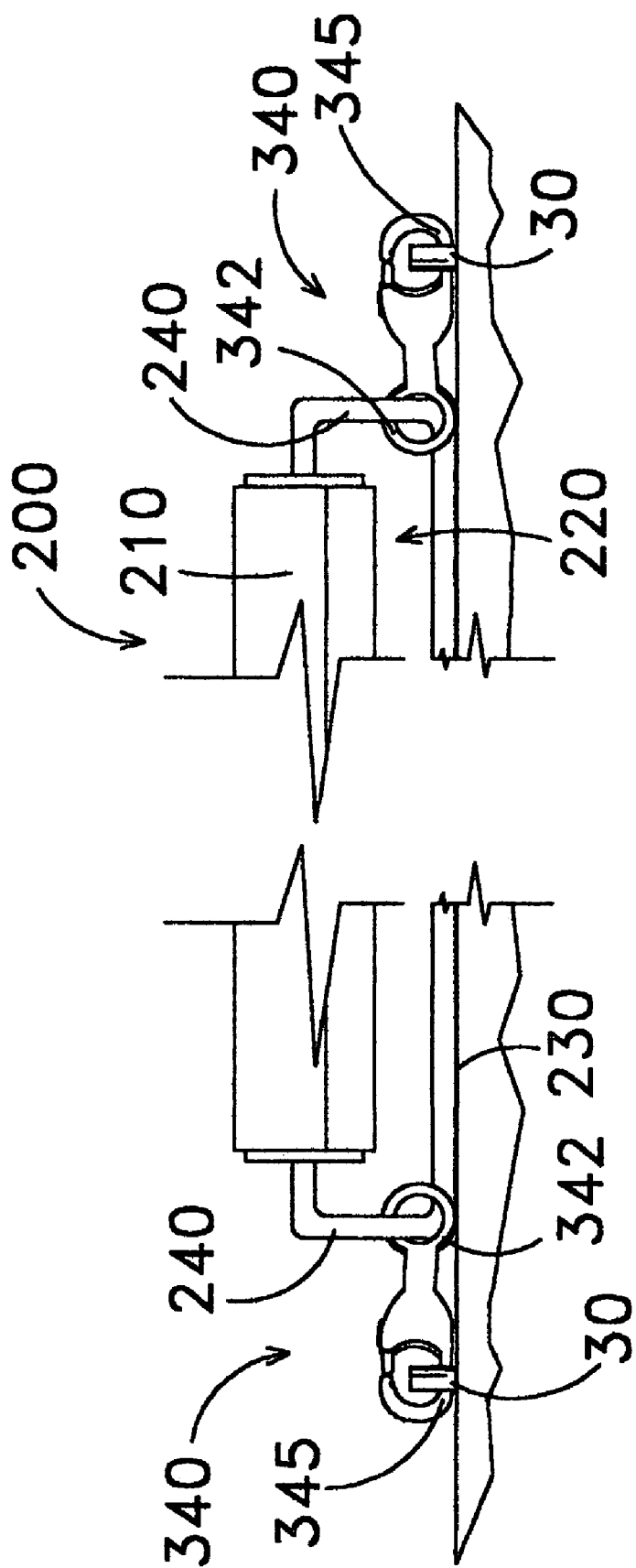
FIG. 12 shows a view of the universal bumper guard with a snap-ring connection device connecting to posts.

In FIGS. 11 and 12, snap rings 340 are slideably connected to the rear portion 230 and side portions 240 of the frame 220. The snap rings 340 include a loop 342 that encircles the rear portion 230 of the frame 220. The snap closure 345 of each snap ring 340 snaps to a D-ring 40 of the trunk 20. Since both snap rings 340 include loops 342, the snap rings 340 may slide on the rear portion 230 and/or the side portions 240 of the frame 220 to connect to D-rings 40 which may be in different positions depending on the size of the trunk 20 and/or the make and model of the automobile 10.

Figure 13A:
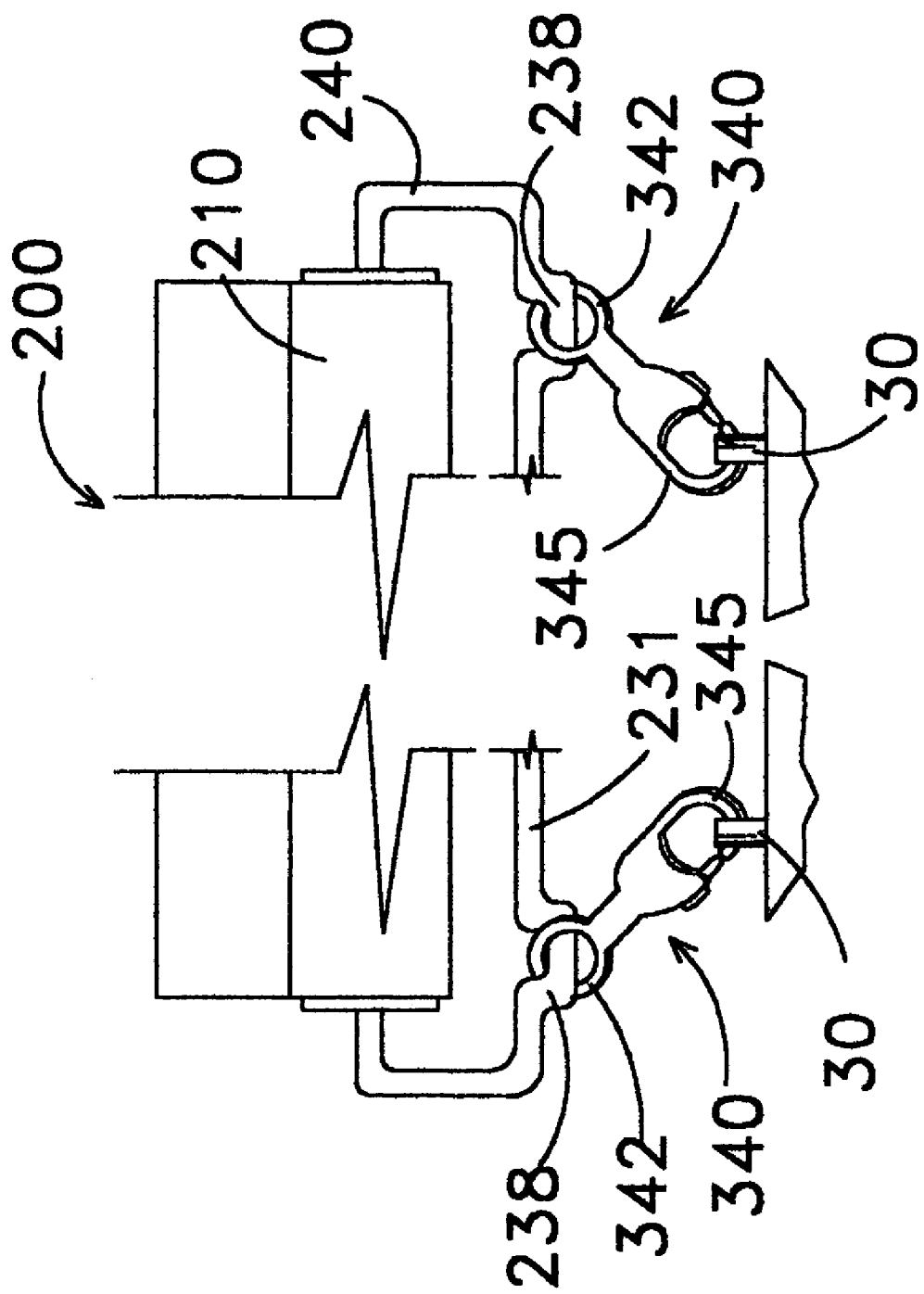
FIG. 13(a) shows a view of the universal bumper guard with the rear portion of the frame having indents.

FIG. 13 shows view of a second rear portion 231 having indents 238. The indents 238 provide stability to the universal bumper guard as the loop 342 settles in the indents 238. The rear second portion 231 may have a plurality of indents 238. Generally, the plurality of indents 238 are spaced evenly on the second rear portion 231 to provide for a symmetrical connection to the trunk.

Figure 14:
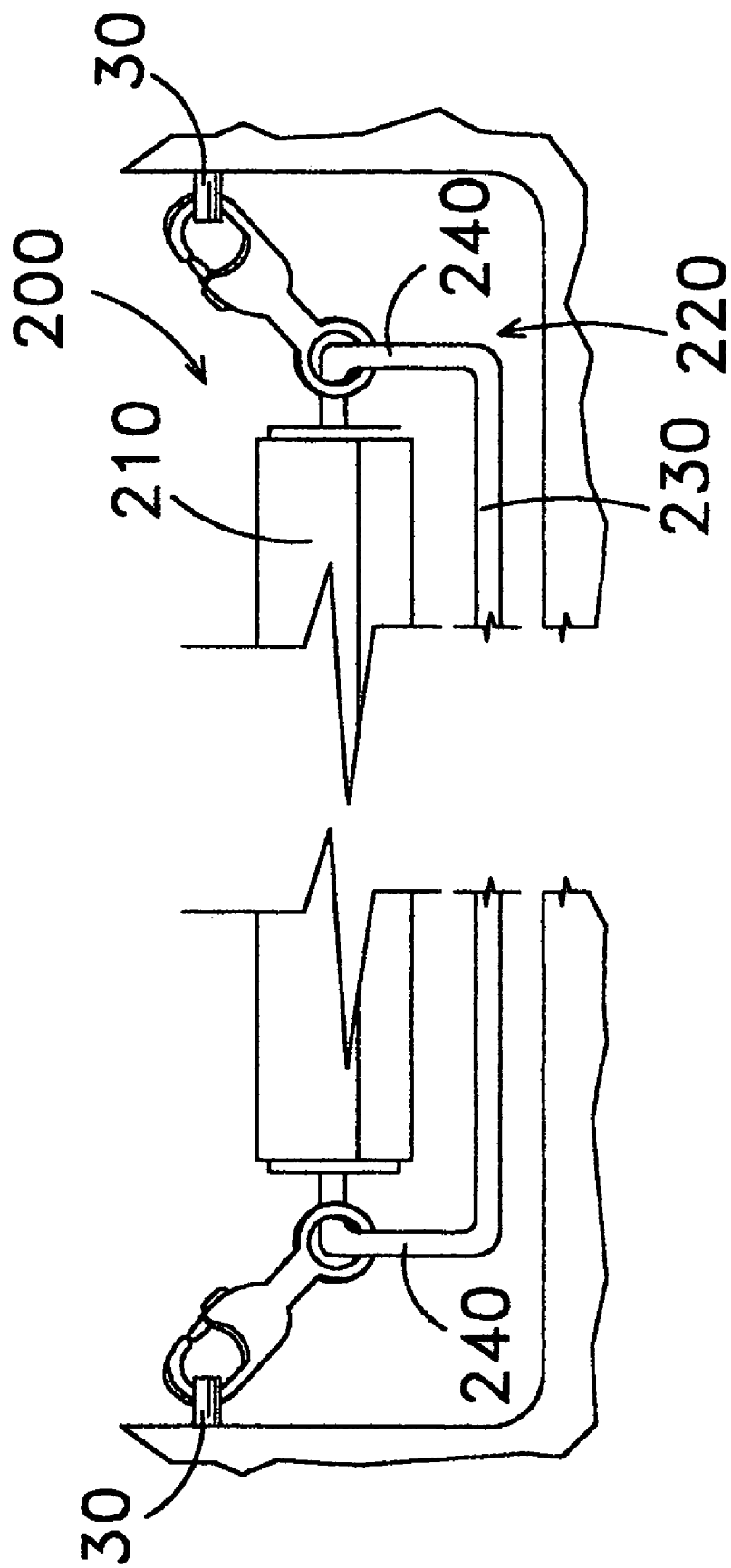
FIG. 14 shows a view of the universal bumper guard connecting to side-mounted posts having holes therein.

FIG. 14 shows the universal bumper guard 200 connecting to posts 30 provided on the side of the trunk 20. As can be ascertained, the present invention provides the ability to accommodate trunks of many sizes and configurations.

Figure 15:
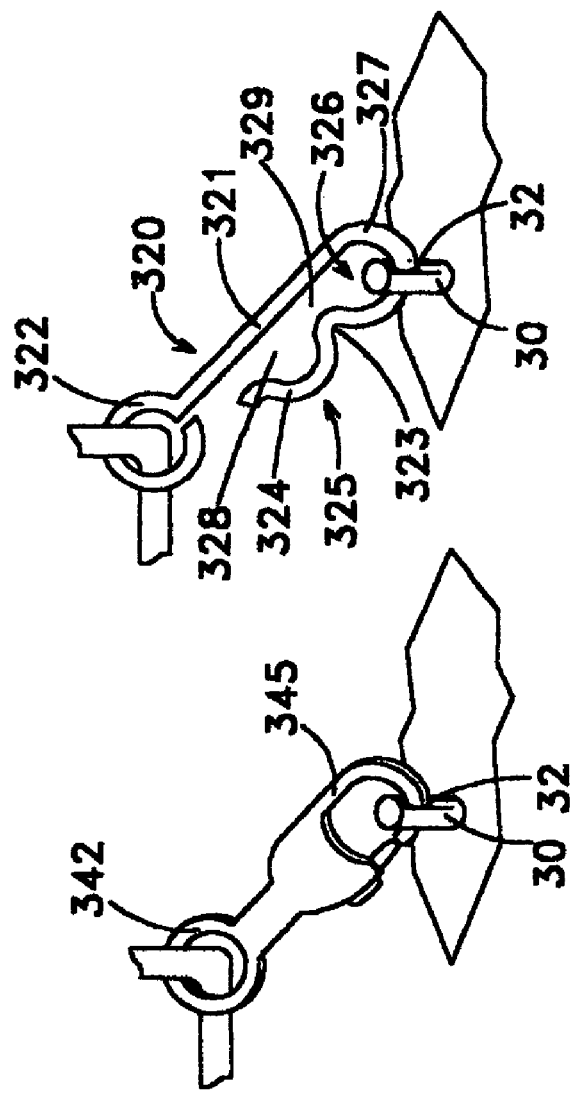
FIG. 15(a) shows a close-up view of a snap-ring connecting to a post of the trunk.
FIG. 15(b) shows a view of a cotter pin connecting to a hole in a post of the trunk.
FIG. 15(c) shows a view of a cotter pin connecting to a post of the trunk.

Most trunks include D-rings or posts. In FIG. 15(a), the snap closure 345 is shown snapping to a post 30 which has holes 32 therein.

FIGS. 15(b) and 15(c) show a further connection device of the present invention. A modified cotter pin 320 includes a loop 322 and a B-shaped member 325. The loop 322 of the cotter pin 320 is slideably connected to the frame 220. The cotter pin 320 may frictionally secure to a post 30 or be inserted through the hole 32 of the post 30. The cotter pin 320 by its B-shaped member 325 includes a first curve 326 and a second curve 328. The first curve 326 may frictionally secure around the post 30. A linear portion 321 of the cotter pin 320 connects the loop 322 to the B-shaped member 325. The length of the linear portion 321 may be adjusted accordingly. A first rounded portion 327 forms the first curve 326 and a second rounded portion 324 forms the second curve 328. A pulling force on the second rounded portion 324 or a pushing force against a point 323 will cause the cotter pin 320 to open at a gap 329 to allow the post 30 to enter the first curve 327. After the pulling force or the pushing force is reduced, the first curve 327 will squeeze on the post 30.

Figure 16:
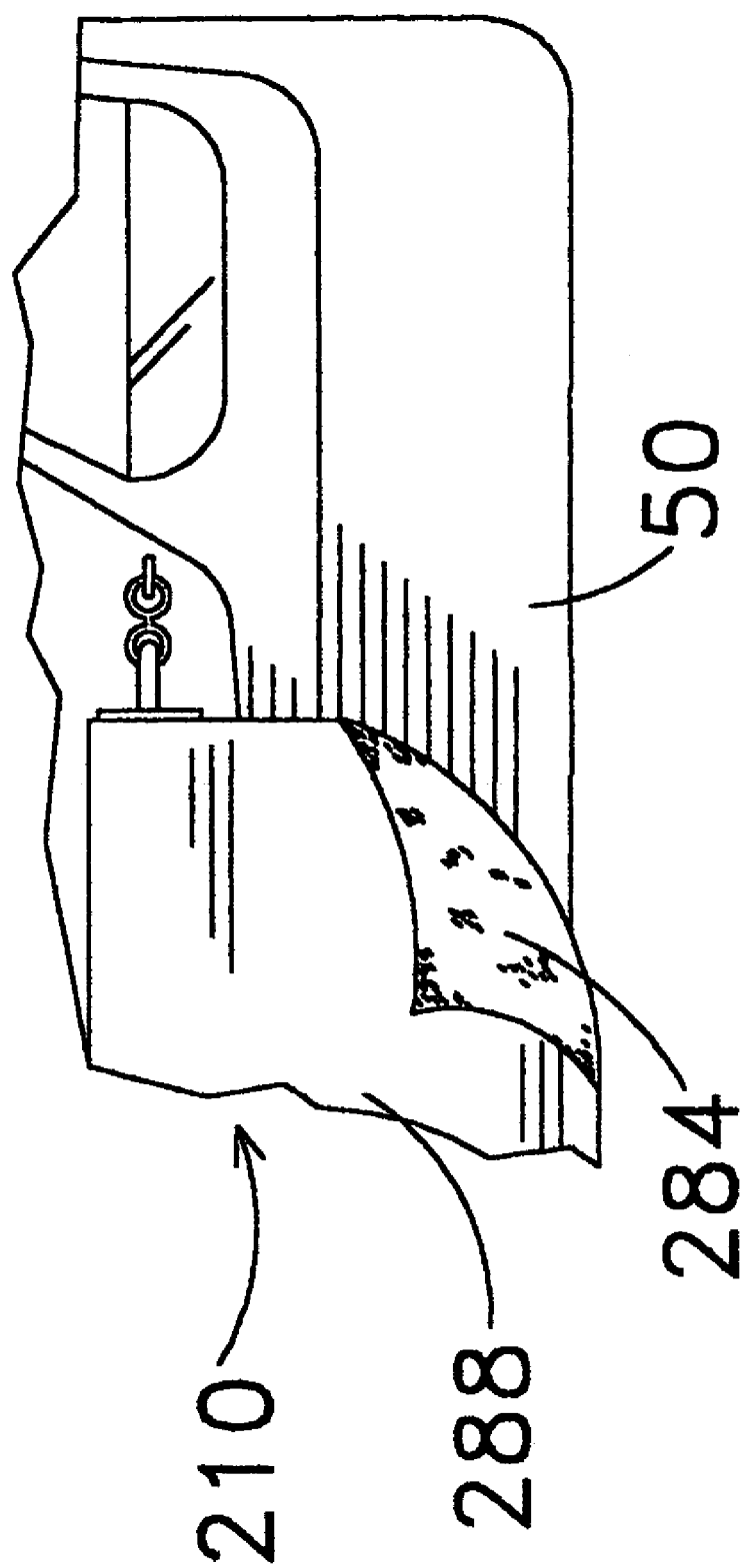
FIG. 16 shows a view of the durable side and a soft side of the tractable cover.

FIG. 16 shows a view of the retractable cover 210. The retractable cover 210 includes a sheet of material 280 having a soft side 284 and a durable side 288. The durable side 288 is shown facing away from the bumper 50 to provide a protective covering to the bumper 50, while the soft side 284 is shown resting on the bumper 50 to not damage the finish of the bumper 50. The durable side 288 should be washable and withstand conventional solvents for cleaning.

Figure 17:
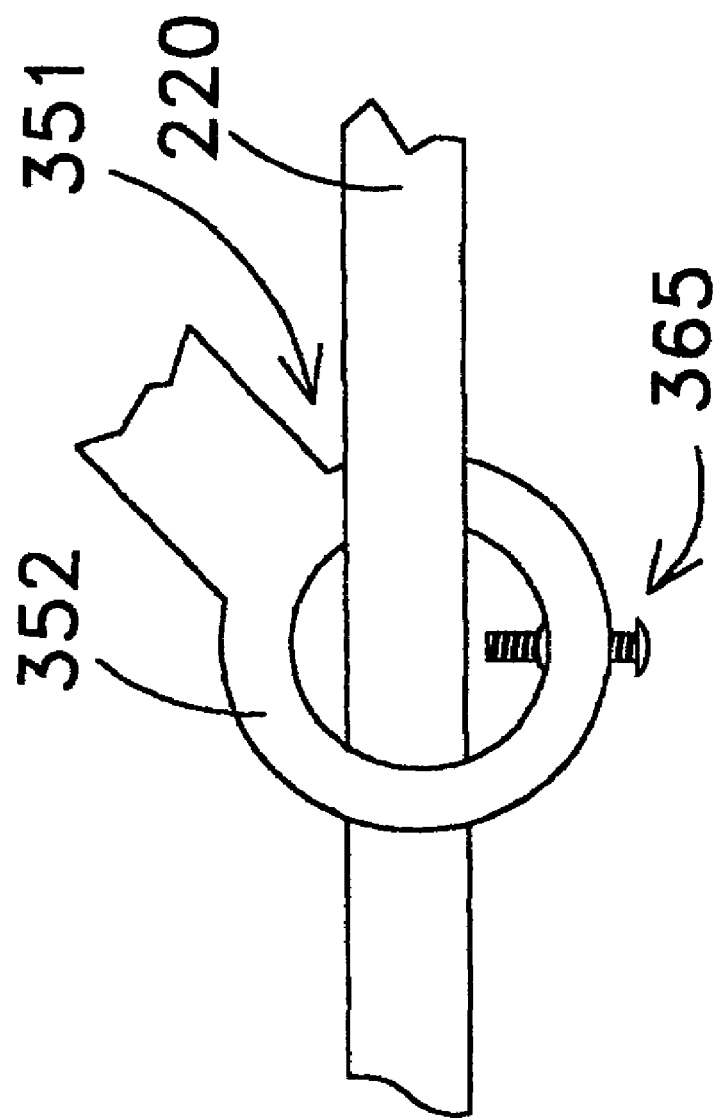
FIG. 17 shows a view of the loop with a tightening device.

FIG. 17 shows a modified snap 351 with a modified loop 352 that may be secured against the frame 220. The modified loop 352 includes a screw 365 that may be tightened against the frame 220. The modified loop 352 allows the user to customize the universal bumper guard to their particular trunk.

Figure 19:
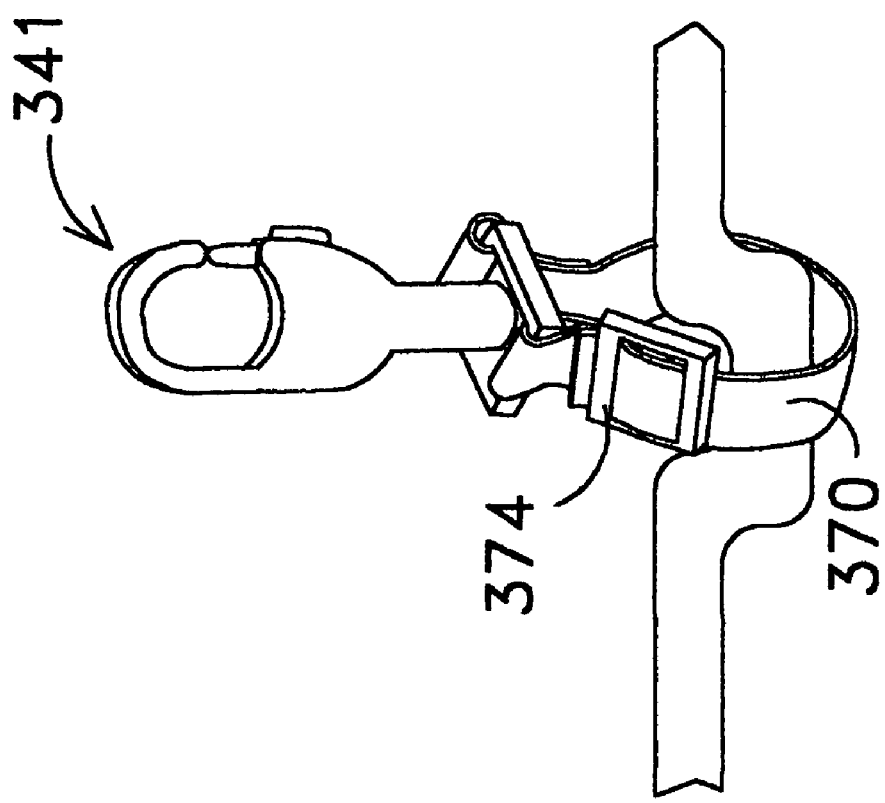
FIG. 19 shows a view of the fabric strap with a compression-tightening device.
Figure 18:
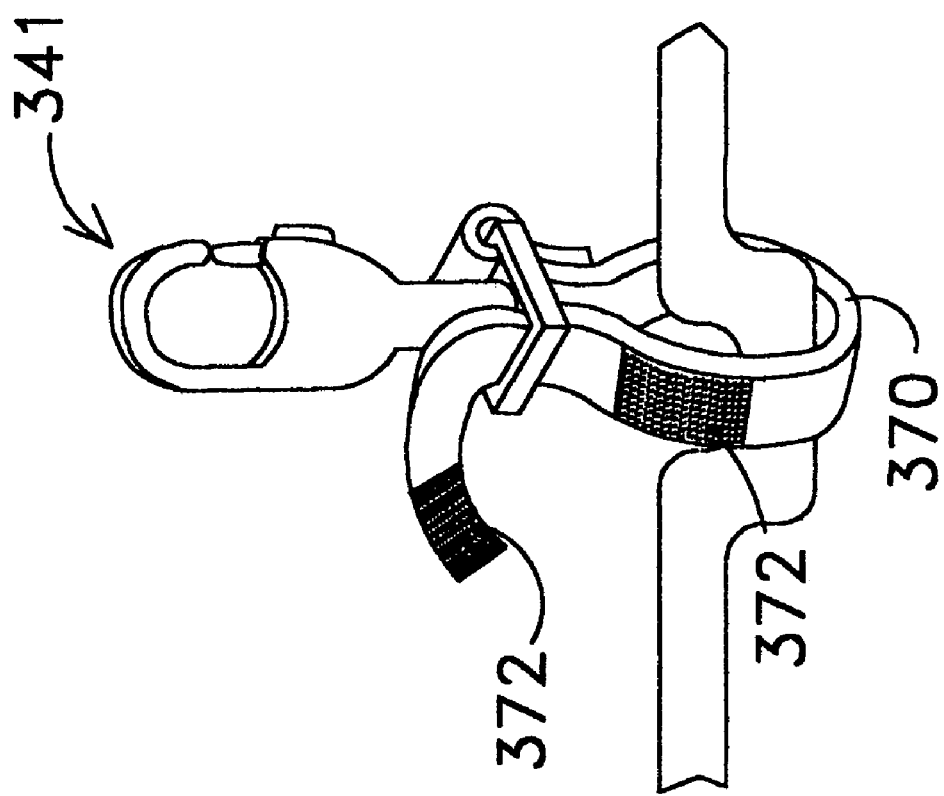
FIG. 18 shows a view of the fabric strap connected to the frame.

FIGS. 18 and 19 show a fabric strip 370 attached to a snap ring 341. The fabric strip 370 may be tightened to the rear portion 230 via hook and loop fasteners 372 shown in FIG. 18, or a compression tightening device 374 shown in FIG. 19.

As shown in FIG. 20, in certain embodiments of the present invention, a top-side of the retractable cover further comprises graphics, advertising, logos, trademarks, etc. For example, the durable side 288 may include branding or advertising, such as golf related advertising or branding for a user who often uses the universal bumper guard 200 at a golf course. The universal bumper guard 200 may also comprise advertising or branding for an academic institution or athletic team making the universal bumper guard 200 well suited for tail-gating activities. The universal bumper guard 200 may comprise corporate specific advertising making the universal bumper guard 200 well suited for a corporate promotional product.

The use of the present invention includes: connecting a securing end (such as the snap or the cotter pin) of a first connection device to a trunk; connecting a securing end of a second connection device to the trunk; connecting a slideable end (such as a loop) of the first connection device to a frame, such that the slideable end slides on the frame; and connecting a slideable end of the second connection device to the frame, such that the second end slides on the frame; wherein the frame secures a cover housing that comprises a retractable cover; and drawing and retracting the cover as needed.

The present invention provides a universal bumper guard that may be temporarily connected and disconnected to nearly every commercially available automobile. Importantly, the connection device utilized by the universal bumper guard does not require any permanent attachment to the automobile. The connection device does not require any screws of other fixing devices boring into the trunk of the automobile or any adhesives applied to the floor of the trunk or the side of the trunk. Instead, the universal bumper guard of the present invention utilizes the existing structures of the automobile. Moreover, the novel structure of the universal bumper guard of the present invention will adjust to nearly every automobile.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

What is claimed is:

1. A universal bumper guard, comprising:
   a retractable cover;

a rotating axis and a retraction mechanism that winds and unwinds the retractable cover;
a frame holding the rotating axis;
the frame comprising a rear portion and side portions, wherein the side portions are bent relative to the rear portion; and
connection devices for connecting the frame to an interior region of the trunk of the automobile, wherein the connection devices are slidably connected to the rear or side portions of the frame, and the connection devices slide over one of the side portions to the rear portion of the frame or the connection devices slide from the rear portion to and over one of the side portions.

2. The universal bumper guard according to claim 1, wherein the connection devices are a snap with a ring or a cotter pin with a ring.

3. The universal bumper guard according to claim 2, wherein the ring of the snap of the ring of the cotter pin is slidably connected to the frame.

4. The universal bumper guard according to claim 1, wherein a top-side of the retractable cover is a durable, scratch-resistant, and puncture-resistant material and a bottom-side of the retractable cover is a soft, non-scratch material.

5. A universal bumper guard, comprising:
a retractable cover;
a rotating axis and a retraction mechanism that winds and unwinds the retractable cover;
a frame holding the rotating axis;
the frame comprising a rear portion and side portions;
connection devices for connecting the frame to an interior region of the trunk of the automobile, wherein the connection devices are slidably connected to the rear or side portions of the frame, wherein the rear portion, the side portions, or both the rear portion and the side portions have a plurality of indents, wherein the connection devices comprise loops that encircle the frame, wherein the loops settle in the plurality of indents.

6. A universal bumper guard, comprising:
a retractable cover;
a rotating axis and a retraction mechanism that winds and unwinds the retractable cover;
a frame holding the rotating axis;
the frame comprising a rear portion and side portions, wherein the rear portion is in slideable communication with the side portions; and
connection devices for connecting the frame to an interior region of the trunk of the automobile, wherein the connection devices are slidably connected to the rear or side portions of the frame, wherein the side portions are approximately the same length and the rear portion is longer than the side portions.

7. A universal bumper guard, comprising:
a retractable cover;
a rotating axis and a retraction mechanism that winds and unwinds the retractable cover;
a frame holding the rotating axis;
the frame comprising a rear portion and side portions; and
connection devices for connecting the frame to an interior region of the trunk of the automobile, wherein the connection devices are slidably connected to the rear or side portions of the frame wherein the side portions are generally perpendicular in orientation to the rear portion.

8. The universal bumper guard according to claim 1, wherein the universal bumper guard is temporarily connected and disconnected to a trunk of an automobile.

9. A universal bumper guard, comprising:
a retractable cover;
a rotating axis and a retraction mechanism that winds and unwinds the retractable cover;
a frame holding the rotating axis;
connection devices for connecting the frame to an interior region of the trunk of the automobile, wherein the connection devices are slidably connected to the frame, wherein the connection devices are a modified cotter pin comprising a loop and a B-shaped member, and the loop slidably connects to the frame.

10. The universal bumper guard according to claim 9, wherein the B-shaped member forms two curves.

11. The universal bumper guard according to claim 9, wherein the B-shaped member frictionally secures to a post or threadably secures to a post.

12. The universal bumper guard according to claim 9, wherein the B-shaped member connects to the loop via a linear portion.

13. The universal bumper guard according to claim 1, wherein a top-side of the retractable cover further comprises graphics, advertising, logos, or trademarks.

14. A method of using a universal bumper guard, comprising:
connecting a securing end of a first connection device to a trunk;
connecting a securing end of a second connection device to the trunk;
connecting a slideable end of the first connection device to a frame, the frame comprising a rear portion and side portions to receive the slideable end, wherein the side portions are bent relative to the rear portion, and the first connection device slides over one of the side portions to the rear portion of the frame or the first connection device slides from the rear portion to and over one of the side portions;
connecting a slideable end of the second connection device to the frame, on and the second connection device slides over one of the side portions to the rear portion of the frame or the second connection device slides from the rear portion to and over one of the side portions; wherein the frame secures a rotating axis and a retractable cover.

15. The method according to claim 14, further comprising:
connecting the securing ends of the first connection device and the second connection device to pre-existing D-rings or pre-existing posts in the trunk.

16. The method according to claim 14, wherein the slideable end comprises a loop.

17. The method according to claim 14, wherein the securing end comprises a snap or a cotter pin.

18. A method of using universal bumper guard, comprising:
connecting a securing end of a first connection device to a trunk;
connecting a securing end of a second connection device to the trunk;
connecting a slideable end of first connection device to a frame, such that the slideable end slides on the frame; and
connecting a slideable end of the second connection device to the frame, such that the second end slides on the frame; wherein the frame secures a retractable cover, wherein the connection device comprises a modified cotter pin comprising a loop for the slideable end and a B-shaped member for the securing end, wherein the B-shaped member frictionally secures to the post threadably secures to the post.

19. The method according to claim 14, wherein a top-side of the retractable cover further comprises graphics, advertising, logos, or trademarks.

20. A method of using a universal bumper guard, comprising:
   connecting a slideable end of a first connection device to a frame that holds a rotating axis that winds and unwinds a retractable cover, the frame comprising a rear portion and side portions, wherein the side portions are approximately the same length and the rear portion is longer than the side portions, and the first connection device slides over one of the side portions to the rear portion of the frame or the first connection device slides from the rear portion to and over one of the side portions;
   connecting a slideable end of a second connection device to the frame, and the second connection device slides over one of the side portions to the rear portion of the frame or the second connection device slides from the rear portion to and over one of the side portions;
   sliding the first connecting device on the frame to connect a securing end of the first connection device in a temporary manner to a first pre-existing structure in a trunk of an automobile;
   sliding the second connecting device on the frame to connect a securing end of the second connection device in a temporary manner to a second pre-existing structure in the trunk of an automobile;
   unwinding the retractable cover;
   disconnecting the securing ends of the first and second connection devices from the first and second pre-exiting structures; and
   removing the universal bumper guard from the automobile.

21. A universal bumper guard, comprising:
   a retractable cover;
   a rotating axis and a retraction mechanism that winds and unwinds the retractable cover;
   a frame holding the rotating axis;
   the frame comprising a rear portion and side portions, wherein the side portions are bent relative to the rear portion, wherein the rear portion is in slideable communication with the side portions; and
   connection devices for connecting the frame to an interior region of the trunk of the automobile, wherein the connection devices are slidably connected to the rear or side portions of the frame.

* * * * *